United States Patent Office 3,024,973

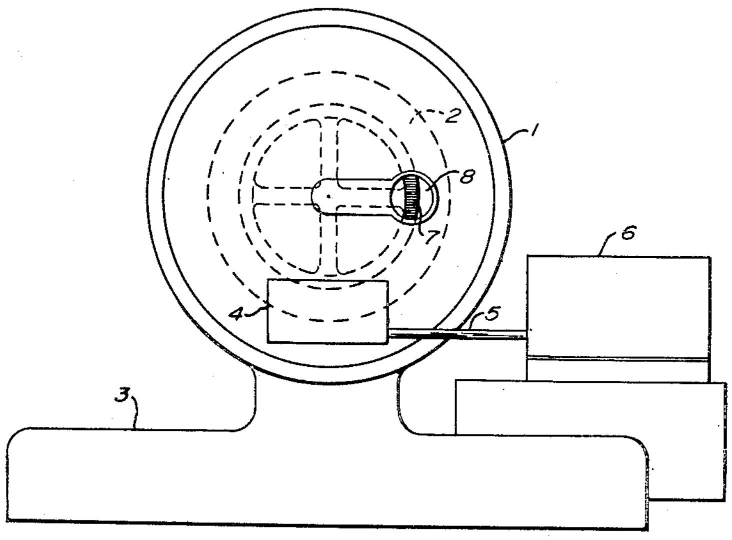
Fig. I
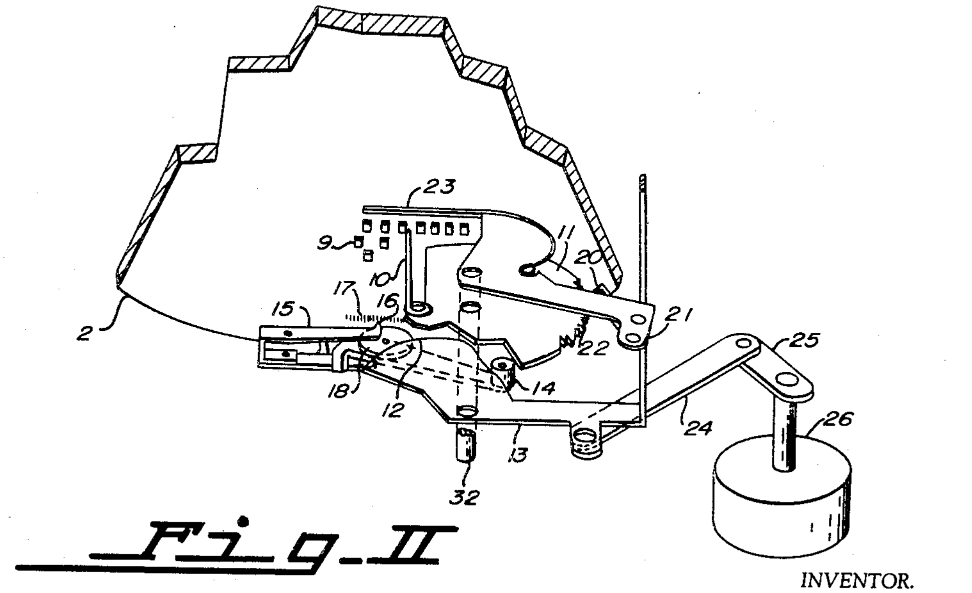
Fig. II
INVENTOR.
GEOFFREY T. GRAY
BY
Marshall, Marshall & Yeasting
ATTORNEYS March 13, 1962 G. T. GRAY 3,024,973
ADJUSTABLE CHART SENSING MECHANISM
Filed May 23, 1957
7 Sheets-Sheet 2
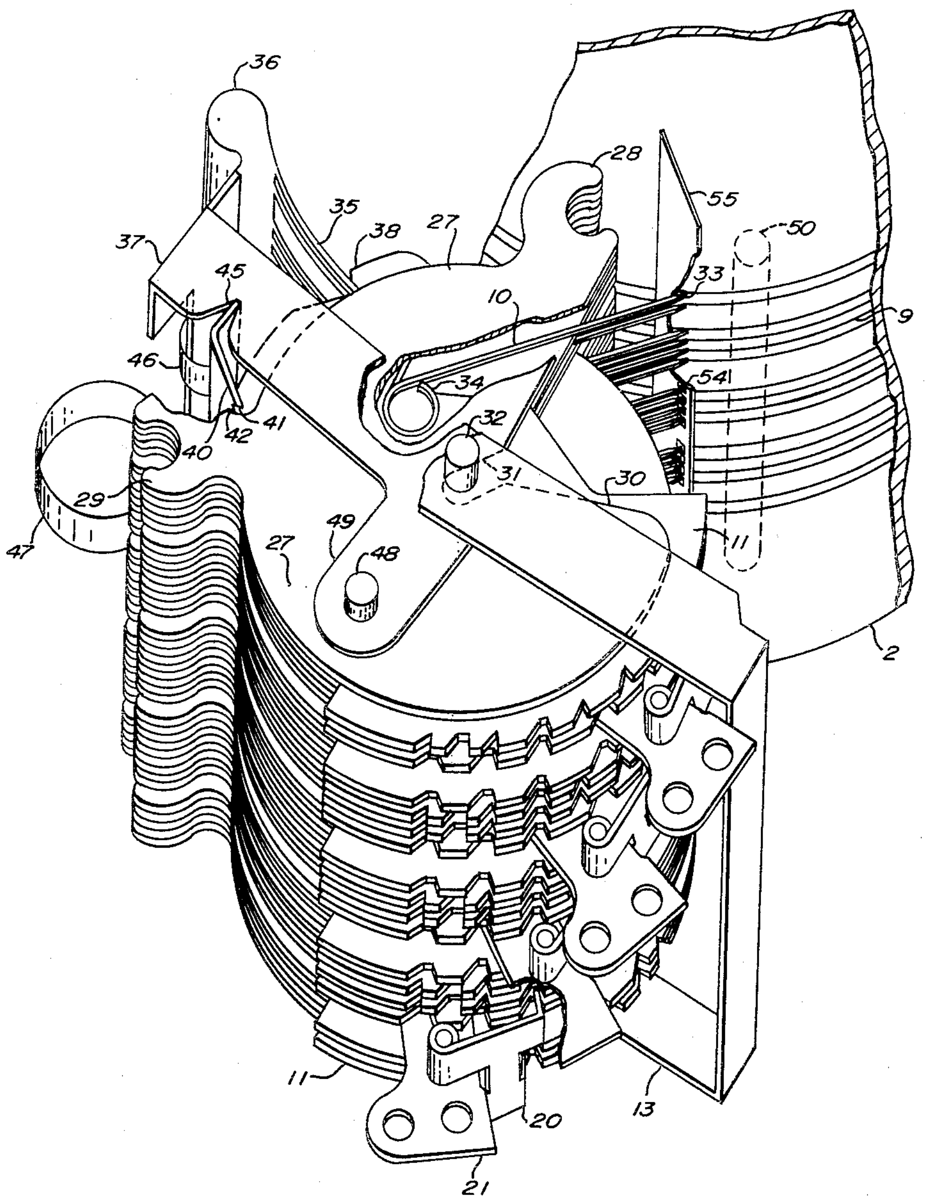
Fig-III
INVENTOR.
GEOFFREY T. GRAY
BY
Marshall, Marshall + Yeasting
ATTORNEYS

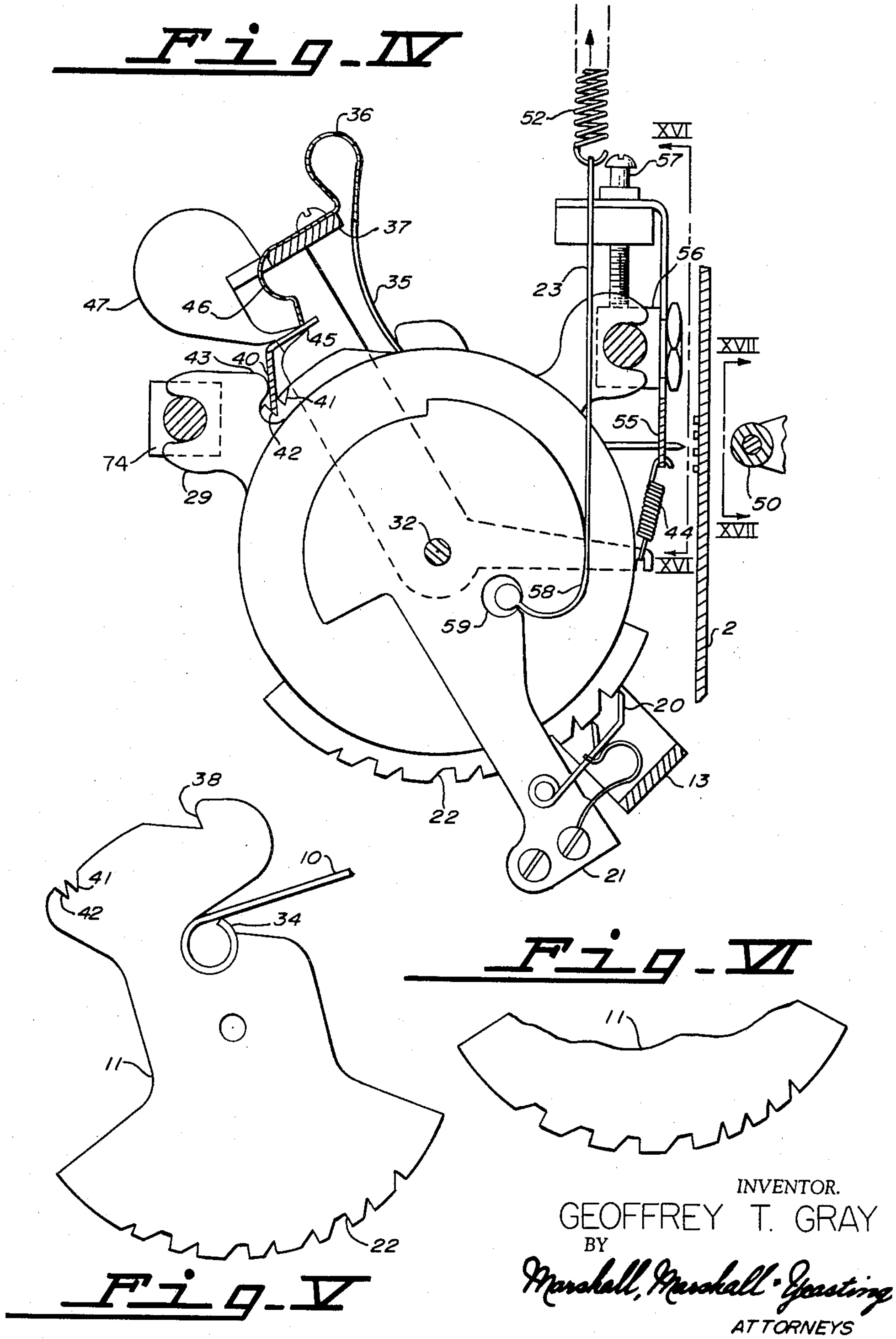
Fig. IV, Fig. V, Fig. VI
INVENTOR.
GEOFFREY T. GRAY
BY
Marshall, Marshall & Yeasting
ATTORNEYS

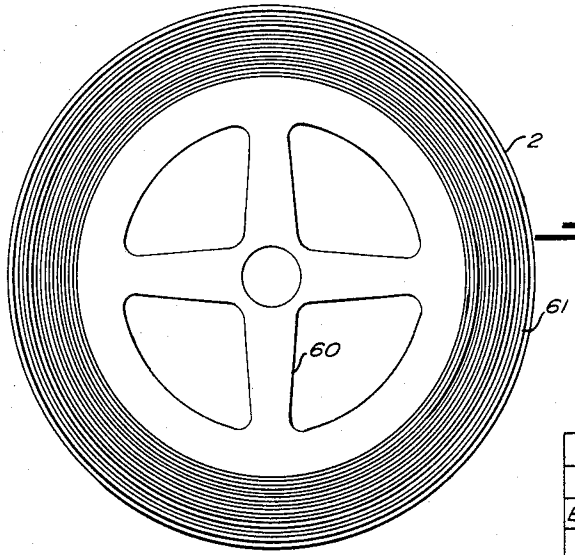
Fig. VII
| CODE | | | | |
|---|---|---|---|---|
| | A | B | C | D |
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
Fig. XI
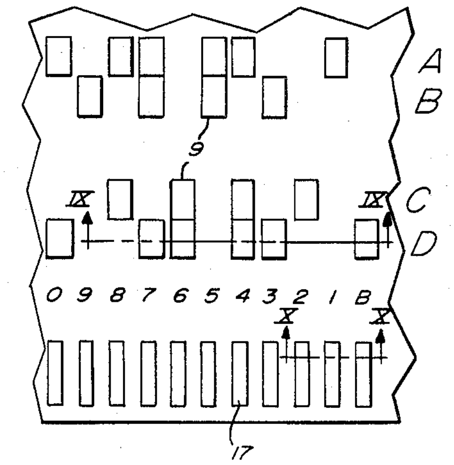
Fig. VIII
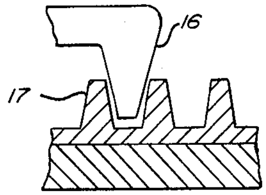
Fig. X
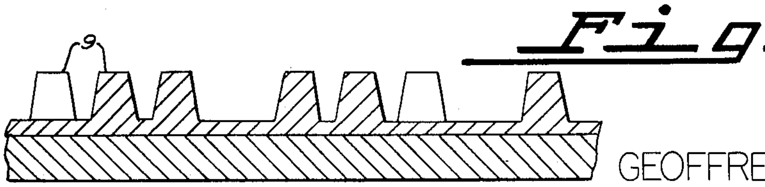
Fig. IX
INVENTOR.
GEOFFREY T. GRAY
BY
Marshall, Marshall & Yeasting
ATTORNEYS

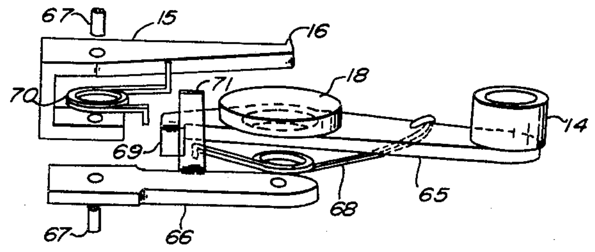
Fig. XII
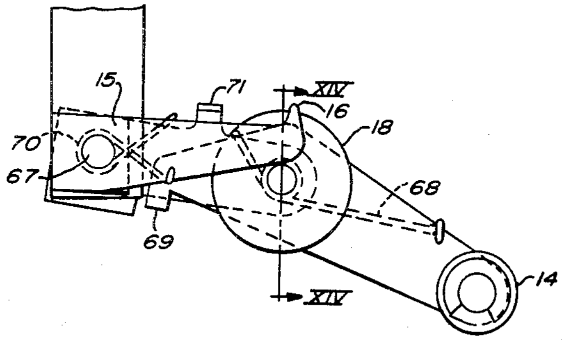
Fig. XIII
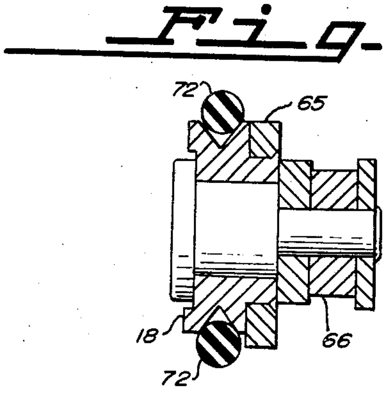
Fig. XIV
INVENTOR.
GEOFFREY T. GRAY
BY
Marshall, Marshall & Yeasting
ATTORNEYS

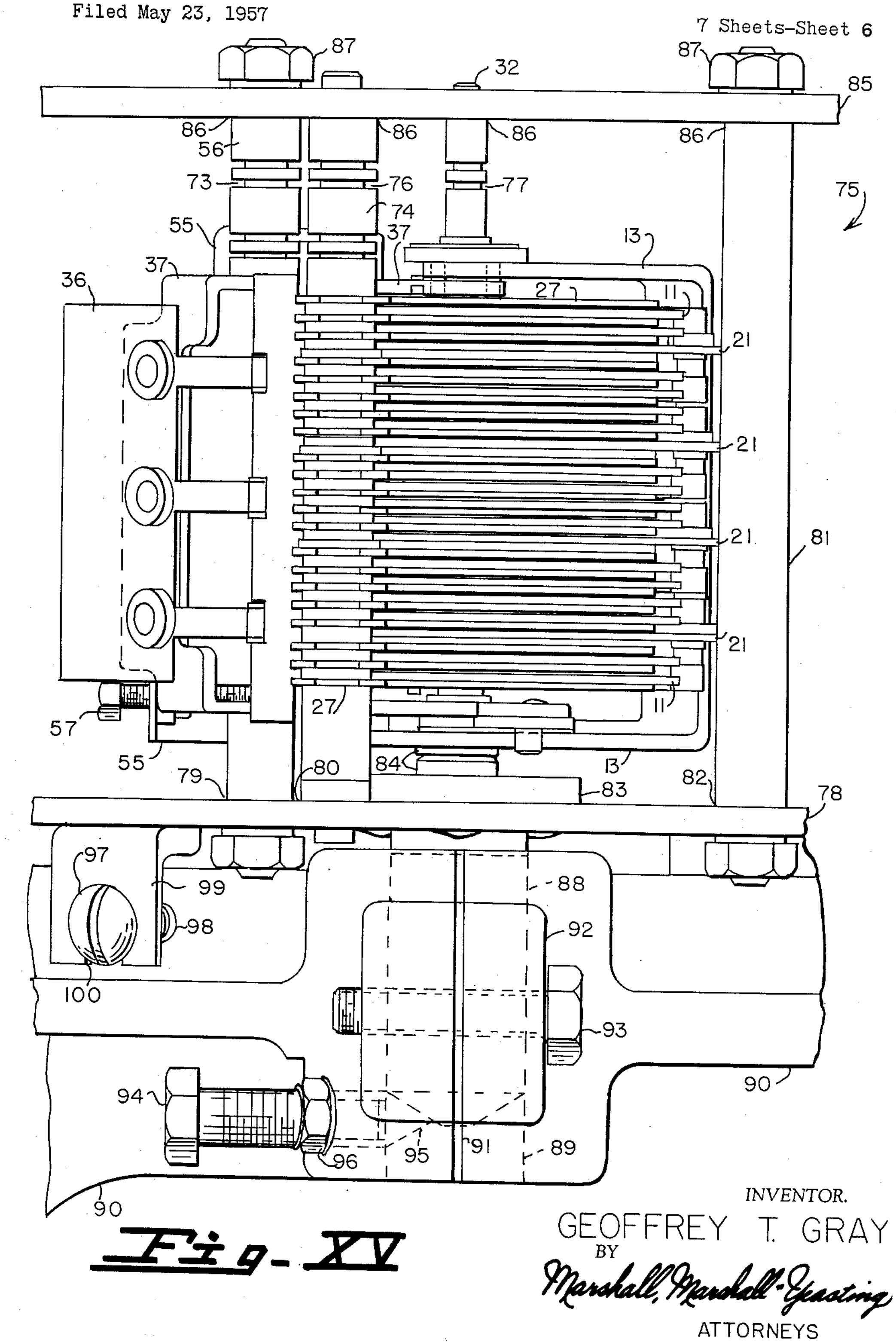
Fig - XV
INVENTOR.
GEOFFREY T. GRAY
BY
Marshall, Marshall & Yeasting
ATTORNEYS March 13, 1962 G. T. GRAY 3,024,973
ADJUSTABLE CHART SENSING MECHANISM
Filed May 23, 1957 7 Sheets-Sheet 7
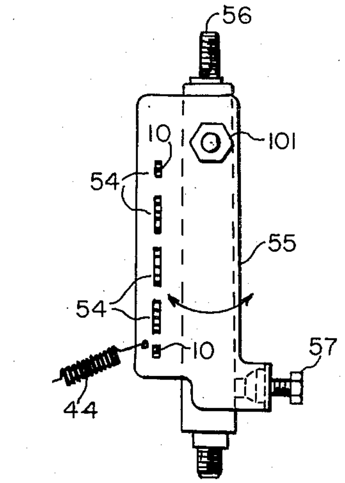
Fig. XVI
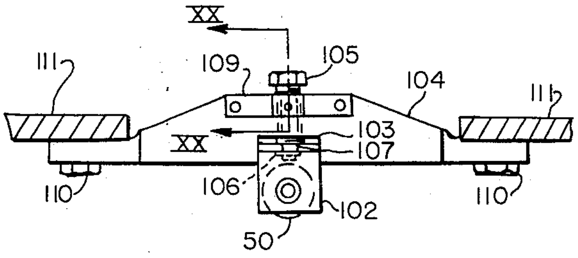
Fig. XVIII
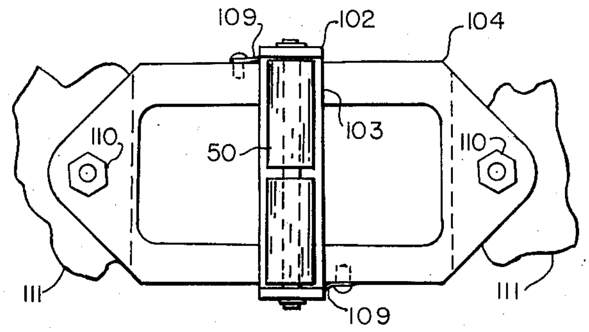
Fig. XVII
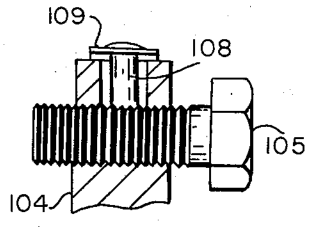
Fig. XX
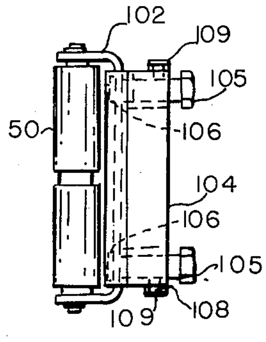
Fig. XIX
INVENTOR.
GEOFFREY T. GRAY
BY
Marshall, Marshall & Yeasting
ATTORNEYS

Patented Mar. 13, 1962

3,024,973

ADJUSTABLE CHART SENSING MECHANISM

Geoffrey T. Gray, Toledo, Ohio, assignor, by mesne assignments, to Toledo Scale Corporation, Toledo, Ohio, a corporation of Ohio Filed May 23, 1957, Ser. No. 661,181
3 Claims. (Cl. 235—1)

This invention relates to mechanical chart reading devices for use in connection with condition responsive instruments or mechanisms to sense the position of the condition responsive member and convert such information as received therefrom into a form suitable for operating indicating or recording devices.

As industrial processes and inventory control using condition responsive instruments become more and more exact there is a need for a corresponding increase in the accuracy of reading and recording the indications of the instruments. While the reading device constructed according to the invention may be applied to various types of condition responsive mechanism it is, for illustrative purposes only, described in connection with its use in a weighing scale for reading the graduations of a chart that moves according to the weight of a load being weighed and setting mechanism for visual display or printing of weight indications in digital form. The accuracy of a digital indication is limited only by the number of places into which the recording may be resolved. In order to get high accuracy it is necessary to graduate the chart with finely spaced graduations and the difficulty of reading, particularly by mechanical means, is thereby materially increased.

The basic reading device with which the invention is concerned is disclosed in application Serial No. 643,708 which was filed on March 4, 1957, now Patent No. 2,948,463, and includes a plurality of cooperating permutation members which are individually urged in a direction to engage relatively raised and depressed surfaces of a chart and are retracted from engagement with the chart by means of a common pawl that selectively engages one of two notches in each of the permutation members so as to retract such members without disturbing their relative positions. The common pawl in fully retracted position locks the permutation members against relative motion so that notched peripheries of the members may be searched for aligned notches corresponding to the relative positions as determined by a permutation code. The present invention provides means for adjusting and guiding such reading device relative to said chart, precise adjustment and proper guiding of the device relative to the chart being very important in attaining high accuracy of reading and recording the indications of condition responsive instruments.

It is, accordingly, the principal object of this invention to provide adjustment and guiding means for a chart reading mechanism, whereby such mechanism is reliable and extremely accurate.

Another object of the invention is to provide, in a chart reading mechanism, means for adjusting and guiding the mechanism relative to the chart which means are simple to operate and are reliable, yet are of rugged and low cost construction.

Other objects and advantages will be apparent from the following description in which reference is had to the accompanying drawings.

A preferred form of the invention is illustrated in the accompanying drawings.

In the drawings:

FIGURE I is an elevation of a weighing scale dial mechanism showing the location of the reading device and a recording device operated thereby as they are mounted on a weighing scale mechanism;

FIGURE II is a fragmentary schematic diagram to illustrate some of the operating principles of the mechanism;

FIGURE III is a diametric view of the permutation members and the drive mechanism therefor to show their cooperation with each other and with the chart;

FIGURE IV is a horizontal section through the lower portion of the assembly of permutation members to show the cooperation between the permutation members and the drive therefor;

FIGURE V is a plan view of one of the permutation members to show its notch pattern;

FIGURE VI is a fragmentary plan view of the notched portion of another permutation member to show a second notch pattern;

FIGURE VII is a front elevation at reduced scale of a weighing scale chart suitable for use with the permutation reading device;

FIGURE VIII is an enlarged fragment of the graduated portion of the weighing scale chart illustrated in FIGURE VII;

FIGURE IX is a section at enlarged scale taken substantially along the line IX—IX of FIGURE VIII to illustrate the shape of the individual chart graduations;

FIGURE X is a section at enlarged scale taken along the line X—X of FIGURE VIII to show the shape of locating notches employed to locate the chart prior to taking a reading;

FIGURE XI is a table showing the permutation code used for each of the graduations of the chart;

FIGURE XII is an exploded view of locating mechanism employed to center the chart graduations prior to taking a reading so as to avoid any possibility of selector pins of the permutation members failing to properly engage the chart graduations;

FIGURE XIII is a plan view of the locating device;

FIGURE XIV is a vertical section along the line XIV—XIV of FIGURE XIII;

FIGURE XV is an enlarged, elevational view of the device which is illustrated in FIGURE III with the addition of a supporting base and frame embodying the adjusting and guiding means of the present invention;

FIGURE XVI is an elevational view as seen from a position along the line XVI—XVI of FIGURE IV looking in the direction indicated by the arrows;

FIGURE XVII is an elevational view as seen from a position along the line XVII—XVII of FIGURE IV looking in the direction indicated by the arrows;

FIGURE XVIII is a plan view of the device which is illustrated in FIGURE XVII;

FIGURE XIX is an end elevational view of the device which is illustrated in FIGURE XVII; and FIGURE XX is an enlarged vertical, sectional view taken substantially along the line XX—XX of FIGURE XVIII.

These specific figures and the accompanying description are intended merely to illustrate the invention and not to impose limitations on its scope.

For the purpose of illustration, the reading device is shown in connection with an ordinary dial type weighing scale. Such a scale comprises a dial housing 1 that contains automatic load counterbalancing and indicating mechanism which may include a chart 2 that is rotated through increments of angle that are proportional to increments of weight applied to the scale. The chart housing 1 is mounted on the top of a scale column 3 of which only the top portion is shown in FIGURE I.

The chart reading mechanism is contained within a housing 4 attached to the dial housing 1 and is connected through a conduit 5 to a printer or other utilization device 6 which is to be operated according to the scale readings. The chart 2 has on its face a series of graduations 7 that are visible through a magnifying lens 8 to provide visual indications of the load on the scale. The face of the chart 2 is also provided with molded graduations or indicia 9 consisting of relatively raised and depressed surfaces, as shown in greater detail in FIGURES VIII, IX and X, constituting the indicia that are sensed by the reading device contained within the housing 4.

FIGURE II shows in schematic form one of each of the essential elements of the reading device while FIGURE III shows a complete assembly of the sensing and selecting portions of the reading device. Referring first to FIGURE II, a reading of the chart 2 is taken by first advancing a series of sensing pins 10, one of which is shown, by spring-urged rotation of permutation disks 11 to positions at which they are arrested by engagement of the sensing pins 10 with the indicia 9 of the chart 2. Prior to the engagement of the sensing pins 10 with the indicia 9, a cam 12 forming part of a drive member 13, through engagement with a roller 14, drives a resiliently mounted finger 15 toward the chart until its tip 16 engages a row of raised teeth 17 and comes to rest either between adjacent teeth or on the crest of a tooth. Continued motion of the cam follower 14 turns a rubber tired wheel 18 in a direction tending to move the chart 2 so that the tip of the finger 16, if it had lodged on a crest of a tooth 17, is permitted to enter the space between two of the teeth and thus locate the chart 2. If the tip 16 were already engaged in a space between two of the teeth 17 the wheel slips leaving the chart 2 in position with the corresponding graduation centered in the path of the sensing pins 10. Thus, the pins 10 either enter squarely into the spaces between indicia 9 or onto the crests depending upon the coding of the indicia for that particular graduation.

After the permutation disks 11 are retracted, without disturbing their relative positions as determined by the engagement of the sensing pins 10 with the chart 2, search pawls 20, one for each decade, carried on pawl arms 21 and each cooperating with four of the permutation disks 11 search notches 22 in the peripheries of the permutation disks 11. As each pawl finds aligned notches in its set of four permutation disks 11 it stops the pawl carrier in a position corresponding to the particular graduation of the chart being sensed. The stopped pawl carriers, through their connections through cables 23, position a reading device or indicating device according to the sensed graduation.

The movement of the drive member 13 is produced and controlled by a connecting rod 24 and crank 25 driven by a motor 26 equipped with controls to cause it to drive the crank 25 through one revolution for each start signal.

The sequence of steps in thus taking a reading from the chart 2 is to energize the motor such that it turns the crank 25 and thus oscillates the drive member 13. This oscillation first drives the cam follower 14 and finger 15 toward the chart to locate it with a graduation accurately in line with the sensing pins 10. During the oscillation of the drive member 13 the permutation disks 11, four for each decade, are driven so that their respective pins 10 engage the chart and then are retracted without disturbing their relative positions with respect to each other to a locking position at which they are held while the searching pawls 20, one for each group of four permutation disks or one for each decade, search the peripheries of the permutation disks 11 for the aligned notches. Upon finding the aligned notches the pawls stop the respective pawl carriers 21 in proper indicating positions.

The whole combination or assembly of permutation disks and drive members is shown in greater detail in FIGURE III. The complete stack up of permutation disks 11 for a four place number includes sixteen of the permutation disks 11, four pawl carriers 21, and enough spacers 27 to separate each of the permutation disks 11 from its neighbor or from a pawl carrier 21 as the case may be. Thus, sixteen permutation disks 11 and four pawl carriers 21 plus an extra spacer at the top of the stack requires a total of twenty-one spacers 27. Each of the spacers is provided with bifurcated ears 28 and 29 adapted to slip into notches in support rods of a frame with the rods holding the spacers in alignment and in spaced relation. Each of the spacers also has an inwardly directed notch 30 on the side facing the chart that terminates in a narrow slot 31 adapted to fit into a corresponding groove cut in an axle 32 on which the permutation disks 11 and pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The sensing pins 10 each has a pointed end 33 that is sharp enough to enter the spaces between alternate graduations and yet blunt enough to avoid cutting the chart material and has its other end curled into a circular loop 34 that is a close sliding fit in a hole cut in the connected permutation disk 11 so that the pin moves in the manner of a flat ball and socket joint. This particular construction keeps the thickness of the permutation disk and pin a minimum so that it may fit between closely spaced adjacent spacers 27.

The permutation disks 11 are continually urged in a direction tending to drive the sensing pins 10 against the chart by spring teeth 35 of a comb spring 36 that is carried on a common pawl bail 37. The ends of the spring teeth 35 engage notches 38 in the permutation disks. Movement of the permutation disks 11 under the influence of the springs 35 is limited by a common pawl 40 that is carried in the bail 37 and arranged to selectively engage either of two notches 41 or 42 of each permutation disk 11 and lock it in position when the pawl engages hook-like portions 43 (FIGURE IV) of the bifurcated ears 29 as the bail 37 is urged counterclockwise, as seen in FIGURES III and IV, by a return spring 44 attached to its lower end. The common pawl 40 is held seated in pivot notches 45 of the bail 37 by a plurality of small springs 46 forming part of the comb spring 36 and attached to the bail 37. The pawl 40 is urged into engagement with the notches 41 or 42 by a light spring 47 also attached to the bail 37.

In operation, as the drive member 13 is swept clockwise as seen in FIGURES III or IV it collects the pawl carriers 21 from their previous positions and finally engages an upwardly directed stud 48 carried in an upper arm 49 of the bail 37 so as to drive the bail clockwise through a small distance against the tension of the return spring 44. During the initial movement of the bail 37 it and the permutation disks 11 move as a unit since the disks are held between the spring teeth 35 engaging the notches 38 and the pawl 40 engaging the notches 41 or 42. As the sensing pins 10 engage the chart 2 and drive it against a backup roller 50 the motion of the permutation disks 11 is arrested. The spring teeth 35 yield as the bail 37 continues and the pawl 40 leaves the notches 41 or 42 and slides part way along the smooth periphery of the permutation disks 11 between the notches 41 and 38. This motion is just far enough to make sure that the common pawl 40 is out of the notches. On the return motion of the drive member 13, the spring 44 pulls the common pawl bail 37 counterclockwise so that the common pawl 40 may enter the aligned ones of the notches 41 or 42 in each of the permutation disks according to whether the disk had been advanced by its pin finding a low spot in the chart or whether it had been arrested in the first position with the pin on the crest of a graduation. The continued motion with the common pawl 40 engaged in the permutation disks drives the disks in retracting motion until the common pawl 40 seats behind the hook-like portions 43 of the spacer ears 29. At this point the motion of the common pawl bail 37 is arrested and the permutation disks 11 are all locked in position.

Continuing motion of the drive member 13 allows the pawl carriers 21 to follow as urged by their drive spring 52, one of which is shown in FIGURE IV connected to its cable 23. The pawl carriers 21 move until their pawls 20 find aligned notches in a particular combination of permutation disks with which they cooperate. It is to be noted that the position of the aligned notch may vary according to the relative positions of the groop of disks cooperating with each pawl.

The sensing pins 10 adjacent the chart 2 are guided in slots 54 of a guide plate 55 that is attached to a frame support 56 that serves as the spacing support for the bifurcated ears 28 of the spacers 27. The slots 54 are just wide enough to admit the pins and, thus, accurately guide them closely adjacent the chart 2. As indicated in FIGURE IV, the guide plate 55 is adjustable relative to the frame support rod 56 and is controlled by an adjusting screw 57 that works in opposition to the common pawl bail return spring 44.

The return springs 52 may be the springs in the printer mechanism to maintain tension on the cables 23 or if a commutator, not shown in the drawings, be attached to the pawl carriers 21 the spring 52 may be returned to the frame mechanism merely to apply tension to the cable 23 and do no other useful work. If a printer, as indicated in FIGURE I, is enclosed in the housing 6 the cables 23 are run through the conduit 5 from the selector mechanism in the housing 4.

Referring to FIGURE IV, each cable 23 is passed over an arcuate surface or periphery 58 of its pawl carrier 21 and its end is anchored in a hole 59 drilled through the pawl carrier. The spacers 27 hold the cable 23 from slipping off sideways. The radius of the arcuate surface 58 with respect to the axle 32 on which the pawl carrier is journaled is selected according to the desired travel of the cable 23 for each increment of indication and the spacing of the notches 22 which determine the angular travel of the pawl carrier.

The permutation disks 11 are made with either of two notch patterns and the selector pawls 20 are arranged with one of its teeth advanced two notch spaces ahead of the other tooth. By thus varying the spacing of the pawl teeth and providing the two different patterns for the selected disks it is possible to secure at least eleven different combinations to provide different stopping points for the pawl 20. FIGURES V and VI show the two notch combinations for the permutation disks 11. In the type shown in FIGURE V the notched periphery is divided into twenty-three equal spaces with notches appearing in the first, third, fourth, sixth, ninth, tenth, twelfth, fifteenth, seventeenth, eighteenth, twentieth, and twenty-third spaces counting from left to right. Likewise the permutation pattern shown in FIGURE VI has notches appearing in the first, second, fifth, sixth, ninth, tenth, thirteenth, fourteenth, seventeenth, nineteenth, twenty-first, and twenty-third spaces. These particular notch combinations used in pairs with the offset pawl teeth operate according to the code set forth in FIGURE XI. This code is used in determining the location of the raised and depressed indicia for each of the graduations on the chart 2 to be sensed.

As shown in FIGURE VII, the chart 2 is an annular member carried on a spider 60 and having rows of graduations 61 on its marginal area. The graduations or indicia are preferably molded in the face of the chart in the same manner as phonograph records are made with a plastic layer mounted on a metallic backing plate and the graduations being formed in the plastic layer. The arrangement of graduations for a first fragment of the chart is illustrated in FIGURE VIII. This fragment, starting with the zero indicia of the chart, shows only those graduations in the units or lowest order decade and the row of teeth 17 for locating the chart. The teeth 17 along the marginal area of the chart cooperate with the locating finger 15 and have cross sections as shown in FIGURE X wherein each of the teeth is shown substantially as a conventional rack tooth. The tip 16 of the locating finger 15 is formed as a mating tooth so as to seat firmly in the spaces between the teeth 17.

The indicia 9 with which the sensing pins 10 cooperate are of generally similar shape except for being formed of heavier section inasmuch as the locating pins do not have to fit into the spaces between teeth that are located on adjacent graduations. The chart section shown in FIGURE VIII, as was mentioned, includes that portion starting at the zero graduation which is shown at the right-hand edge. Inasmuch as there are no significant figures to the left of the zero when indicating the zero graduation it is desirable that the indicator show or the printer print a blank at this position. Therefore, the first graduation carries only the single raised portion in the bottom row or D row which, according to the chart shown in FIGURE XI, gives a blank for the output indication. The permutation disk combination for this graduation causes the aligned notch to appear at the end of the travel of the pawls 20 or at the last possible position at which an aligned notch may be formed. If an error is made such that the pawl does not find the aligned notch it overtravels and the printer indicates such overtravel by printing some distinctive symbol in place of a digit. The next graduation, a one, is indicated or denoted by a single raised indicia in the A row; likewise two is indicated by a single indicia in the C row; and the others follow according to the chart. It should be noted that the raised indicia of the chart cause the corresponding permutation disk 11 to be advanced counterclockwise one space as seen in FIGURES III or IV.

Other chart combinations may be employed besides the particular code indicated. However, this particular code was selected in order that the number of different parts could be reduced. Thus, with the selected code two each of the permutation disks 11, shown in FIGURES V and VI, may be employed in each decade in combination with the offset pawl 20. If the offset pawl were not employed then each of the four permutation disks cooperating for each decade would have to have its own combination of notches which would make four different parts to be stocked instead of two.

The chart locating mechanism is illustrated in greater detail in FIGURES XII, XIII and XIV. Referring to FIGURE XII, the cam follower 14 is mounted on the end of a forearm 65 that also carries, as a rigid part thereof, at its elbow end the drive wheel 18 that engages the chart to urge it forward so as to move any tooth 17 falling below the finger tip 16 out of the way and allow the tip 16 of the finger 15 to fall into the space between adjacent teeth 17. The arm 65 is pivotally connected through an elbow joint at the axis of the wheel 18 to a second arm 66 which in turn is pivoted on and, by a spring not shown, is continually urged clockwise about a pin 67 fixed in the framework of the scale. A spring 68 at the joint or elbow at the wheel 18 urges the forearm 65 clockwise with respect to the second arm 66 so that the wheel bears against the chart 2 before the elbow joint starts to turn. The spring urged movement of the forearm 65 relative to the second arm 66 is limited by a down turned ear 69 on the tail end of the forearm 65 that engages the front surface of the lower arm 66. Normally, the spring 68 rotates the forearm 65 to maintain the ear in engagement with the lower arm. However, when the mechanism is pushed toward the chart by the cam pushing on the cam roller 14 the lateral motion of the wheel 18 is arrested and the cam force against the cam follower 14 then rotates the arm 65 around its connection with the lower arm 66 thus producing the relative rotation of the wheel 18.

The finger 15 with its tip 16 is carried on the pin 67 and is urged toward the chart by a spring 70 acting between the lower arm 66 and the finger 15. The forward movement of the finger 15 is limited by a stop 71 erected from the rear portion of the lower arm 66 in position to engage the chart side of the finger 15.

FIGURE XIV is a section taken through the elbow joint between the arms 65 and 66 and shows a rubber tire 72 mounted on the wheel 18 so as to increase the tractive effort of the wheel on the chart.

In the operation of this mechanism the spring 68 is made stiff enough so that when the wheel 18 engages the chart it pushes the chart back against the backup roller 50 before the spring 68 yields and permits the arm 65 to turn relative to the arm 66. This insures that sufficient force is exerted against the chart to cause it to move even though the tip 16 of the finger 15 should be partially caught on the corner of the crest of a tooth. It is necessary that sufficient force be exerted at this time so that the tip of the finger 15 will slide across the crest of a tooth 17 and firmly engage in the valley against the side of the next tooth 17.

The whole combination or assembly of permutation disks, their drive members, and their supporting frame is shown in detail in FIGURE XV. Sixteen permutation disks 11, four pawl carriers 21, and twenty-one spacers 27, for a four place number, are illustrated in FIGURE XV. The bifurcated ears 28 (FIGURE III) of the spacers 27 (FIGURE XV) are adapted to slip into notches 73 in the square support rod 56 of a frame 75 and the bifurcated ears 29 of the spacers 27 are adapted to slip into notches 76 in a square support rod 74 of the frame 75, the rods 56 and 75 holding the spacers in aligned and spaced relationship. As hereinbefore described, each of the spacers 27 also has an inwardly directed notch 30 on the side facing the chart 2 that terminates in a narrow slot 31 adapted to fit into a corresponding groove 77 cut in the axle 32 on which the permutation disks 11, the drive member 13, the bail 37 carrying the comb spring 36, and the pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The frame 75 includes a horizontal lower plate 78 which serves as a support for the rods 56 and 74, there being shoulders 79 and 80 on the rods 56 and 74, respectively, which bear upon the lower plate, and which also serves as a support for a post 81 having a shoulder 82 that also bears upon the lower plate. A tenon which is not shown but which is on the lower end of the axle 32 is received in a flat member 83 secured to the lower plate 78, there being a shoulder on the tenon which supports the axle from the lower plate and a pair of washers 84 loose on the lower end of the axle between the lower part of the rockable drive member 13 and the flat member 83. The axle 32, rods 56 and 74, and post 81 function as four spacers to support an upper plate 85 that is held in place on upper shoulders 86 of the axle, rods, and post by nuts 87.

Integral with the flat member 83 is a vertical, cone-shaped bottomed post or pin 88 which extends through the lower plate 78 well below the plate into a hole 89 in a base 90 that is suitably mounted within the housing 4 (FIGURE I). The base 90 has a vertical slot 91 which communicates with the hole 89 and an integral boss 92 which is split by the slot 91. A cap screw 93 threaded horizontally through the boss 92 functions to adjust the width of the slot 91 and, therefore, the size of the hole 89. When the screw 93 is loosened, the post 88 carrying the frame 75 can be lifted out of the hole in the base 90.

Hence, the reading device including the frame 75 and the stack of permutation disks and their drive members are removable from the base 90 as a unit assembly.

Precise adjustment and proper guiding of the reading device relative to the chart 2 is very important in attaining high accuracy of reading and recording the indications of condition responsive instruments. The frame 75 carrying the reading device is adjustable in a vertical path by loosening the screw 93 so that the pin 88 is free to slide in the hole 89 and by turning a cone-pointed adjustment screw 94, threaded into the base 90, until the cone point 95 on the screw 94, which cooperates with the cone-shaped bottom on the pin 88, moves the pin 88 upwardly in the hole 89 or permits it to move downwardly in the hole depending upon which direction the screw 94 is turned. After the frame 75 is located in its proper vertical position, the screw 93 is retightened and a lock nut 96 on the adjustment screw 94 is tightened.

The frame 75 carrying the reading device also is adjustable about the axis of the pin 88 by loosening the screw 93 so that the pin 88 is free to slide in the hole 89 and by turning one way or the other an adjustment screw 97 that is threaded at 98 into the base 90. The screw 97 is of the double shouldered type, one shoulder cooperating with the outer surface of a bracket 99 depending from the lower plate 78 of the frame 75 at an inverted U-shaped slot 100 in the bracket through which slot the screw 97 extends, and the other shoulder cooperating with the inner surface of the bracket 99 at the slot 100 to form a push-pull connection having a line of action so directed that the frame 75 turns when the adjustment screw 97 is turned. After the frame 75 is located in its proper position, the screw 93 is retightened.

Referring to FIGURE XVI, as hereinbefore described, the sensing pins 10 adjacent the chart 2 are guided in slots 54 of the guide plate 55 that is attached to the frame support 56. The slots 54 are just wide enough to admit the pins and, thus, accurately guide them closely adjacent the chart 2. As indicated in FIGURES IV and XVI, the guide plate 55 is adjustable relative to the frame support rod 56 by being pivotal about the axis of a horizontal shoulder screw 101 that is threaded into the support 56 and is controlled by the adjusting screw 57 that works in opposition to the common pawl bail return spring 44. The axis of the shoulder screw 101 is near to the upper one of the sensing pins 10.

The backup roller 50 also is adjustable relative to the chart 2; it is mounted for rotation on a bracket 102 that is held in a groove 103 in a plate 104 by means of a pair of adjustment screws 105, the bracket being loosely secured to the ends of the adjustment screws 105, which protrude through holes in the bracket, by clips 106 as indicated in FIGURES XVIII and XIX. That is, the ends of the adjustment screws 105 and the clips 106 form push-pull connections, the bracket 102 being pulled horizontally into the groove 103 by the clips 106 when the adjustment screws 105 are turned in the direction which would remove the screws from the plate 104 and the bracket 102 being pushed out of the groove 103 by shoulders 107 on the adjustment screws 105 when the screws are turned in the other direction. The adjustment screws 105 are threaded through the plate 104 as shown in detail in FIGURE XX and turn with difficulty because of short, stiff pieces of wire 108 that are urged resiliently by springs 109, attached to the plate 104, against the adjustment screws 105 at right angles to the axes of the screws. This tends to keep the adjustment screws in their adjusted positions. The plate 104 carrying the backup roller 50 and the adjustment screws 105 is mounted as a unit assembly by means of screws 110 to frame work 111 of the dial housing 1.

The gap between the back of the chart 2 and the backup roller 50 (see FIGURE IV) can be varied by turning both of the adjustment screws 105 which slides the bracket 102 back or forth horizontally in the groove 103. Also, either one of the adjustment screws can be turned to tilt the backup roller 50 vertically, i.e., to tilt the roller relative to the chart 2.

In adjusting the reading device to locate it properly relative to the chart 2 to attain the highest accuracy in reading the chart, first, the gap between the backup roller 50 and the back of the chart 2 is adjusted, as hereinbefore described, to the width of a gauge. The size of the gap depends on such factors as the stiffness of the chart 2 and the distances that the sensing pins 10 are driven toward the chart. After the gap is once chosen experimentally as the one which gives optimum performance, a gauge is made to quickly determine the size of the gaps in subsequent production of the reading devices.

Second, the backup roller 50 is tilted, as hereinbefore described, to get the common pawl 40 aligned in one of the two notches 41 or 42 of each permutation disk 11. A blank part of the chart 2 is used for this adjustment. To make the adjustment, the drive member 13 is turned clockwise as viewed in FIGURES III and IV until the sensing pins 10 engage such blank part of the chart 2 and drive it against the backup roller 50 and until the common pawl 40 leaves the notches 41 or 42 and slides part way along the smooth periphery of the permutation disks 11 between the notches 41 and 38. The backup roller 50 then is tilted until the edge of the common pawl 40 appears to be parallel with the aligned ones of the notches 41 or 42 in each of the permutation disks. The drive member 13 then is allowed to return so that the spring 44 pulls the common pawl bail 37 counterclockwise so that the common pawl 40 may enter the aligned ones of the notches. The common pawl 40 should seat squarely in the bottoms of the aligned ones of the notches as illustrated in FIGURE IV. If it does not, the process is repeated and the backup roller 50 is tilted relative to the chart 2 by trial and error until the pawl 40 aligns with the notches properly.

Third, the frame 75 carrying the assembly of permutation disks and drive members is adjusted both vertically and about the axis of the post 88. One of the molded graduations or indicia 9 on the chart 2 is made extra thin and long and serves as an indexing ridge for this adjustment. To make the adjustment, the frame 75 is adjusted vertically, as hereinbefore described, until the upper one of the sensing pins 10 is at about the same elevation as the top of the indexing ridge 9 and then is adjusted about the axis of the post 88, as hereinbefore described, until such upper one of the sensing pins 10 is aligned horizontally with the top of the indexing ridge 9, i.e., until such sensing pin 10 is in close juxtaposition with such ridge 9.

Finally, the guide plate 55 is rocked about the axis of the shoulder screw 101, as hereinbefore described and as indicated by the double-ended arrow in FIGURE XVI. Such axis is near to the upper one of the sensing pins 10 as illustrated in FIGURE XVI. This angular adjustment is made to align the rest of the sensing pins, the upper one of the pins being previously aligned, with the indexing ridge 9 so that the row of pins is parallel with such ridge.

The adjustments for the chart reading device and for the backup roller 50 provide in a simple structure easily operable means for vertical, horizontal and angular positioning of the sensing pins 10 relative to the condition responsive chart 2 and for locating and positioning the backup roller 50 relative to the chart to obtain optimum performance from the reading device.

Various modifications in the structure may be made without losing the advantages of the structure disclosed or departing from the scope of the invention.

Having described the invention, I claim:

1. In a mechanical chart reading device, in combination, a movable chart positionable by condition responsive mechanism, a frame mounted adjacent the chart, means including a plurality of sensing pins movably mounted in the frame to sense code elements on said chart according to the position of the chart, means for moving the frame generally parallel to the chart to position the sensing pins vertically relative to the chart, means for turning the frame about an axis which is generally parallel to the chart to further position the sensing pins horizontally relative to the chart, and a slotted guide plate rockably mounted on the frame about an axis which is generally perpendicular to the chart for positioning the sensing pins diagonally relative to the chart, the sensing pins extending through the slotted guide plate whereby the plate functions additionally to accurately guide the sensing pins closely adjacent the chart.

2. A device according to claim 1 wherein the axis about which the frame is turned is vertical and the axis about which the guide plate is rocked is horizontal.

3. In a mechanical chart reading device, in combination, a movable chart positionable by condition responsive mechanism, a frame mounted adjacent the chart, means including a plurality of sensing pins movably mounted in the frame to sense code elements on said chart according to the position of the chart, means for moving the frame generally parallel to the chart to position the sensing pins vertically relative to the chart, and means for turning the frame about an axis which is generally parallel to the chart to further position the sensing pins horizontally relative to the chart.

References Cited in the file of this patent

UNITED STATES PATENTS

| | | |
|---|---|---|
| 1,284,188 | Goss | Nov. 5, 1918 |
| 1,623,164 | Carroll | Apr. 5, 1927 |
| 1,677,897 | Lasker | July 24, 1928 |
| 1,688,539 | Fischer | Oct. 23, 1928 |
| 2,121,227 | Haegele | June 21, 1938 |
| 2,370,805 | Leonard | Mar. 6, 1945 |
| 2,374,790 | Terry | May 1, 1945 |
| 2,589,987 | Braun et al. | Mar. 18, 1952 |
| 2,614,632 | Clos | Oct. 21, 1952 |